United States Patent
Cote

(10) Patent No.: US 9,320,263 B2
(45) Date of Patent: Apr. 26, 2016

(54) WEATHER GUARD FOR A BIRD FEEDER

(71) Applicant: Paul L. Cote, Lac Brome (CA)

(72) Inventor: Paul L. Cote, Lac Brome (CA)

( * ) Notice: Subject to any disclaimer, the term of this patent is extended or adjusted under 35 U.S.C. 154(b) by 55 days.

(21) Appl. No.: 14/120,037

(22) Filed: Apr. 17, 2014

(65) Prior Publication Data
US 2015/0296750 A1    Oct. 22, 2015

(51) Int. Cl.
*A01K 39/00* (2006.01)
*A01K 39/012* (2006.01)

(52) U.S. Cl.
CPC .................. *A01K 39/012* (2013.01)

(58) Field of Classification Search
CPC .................................. A01K 39/0113
USPC ................................ 119/57.9, 52.3
See application file for complete search history.

(56) References Cited

U.S. PATENT DOCUMENTS

| | | | | |
|---|---|---|---|---|
| 2,591,459 A * | 4/1952 | Meany | ........................ | 119/52.1 |
| 3,051,126 A * | 8/1962 | Merritt et al. | ................ | 119/52.4 |
| 3,292,589 A * | 12/1966 | Williams | ........................ | 119/77 |
| 3,372,676 A * | 3/1968 | Williams | ..................... | 119/52.3 |
| 4,144,842 A * | 3/1979 | Schlising | ..................... | 119/52.3 |
| 4,732,112 A * | 3/1988 | Fenner et al. | ................ | 119/52.2 |
| 5,285,748 A * | 2/1994 | Weldin | ......................... | 119/57.9 |
| 5,826,542 A * | 10/1998 | Allen et al. | .................. | 119/57.9 |
| 5,829,383 A * | 11/1998 | Blanding | ..................... | 119/52.3 |
| 6,318,290 B1 * | 11/2001 | Fisher | .......................... | 119/51.5 |
| 6,543,384 B2 * | 4/2003 | Cote | ............................ | 119/57.9 |
| D490,576 S * | 5/2004 | Rich et al. | .................... | D30/128 |
| 6,834,616 B2 * | 12/2004 | Fort, II | ......................... | 119/57.8 |
| 6,945,192 B2 * | 9/2005 | Cote | ............................ | 119/57.9 |
| 7,798,099 B2 * | 9/2010 | Vosbikian | .................... | 119/52.3 |
| D692,191 S * | 10/2013 | Stephens et al. | ............. | D30/127 |
| 2004/0261726 A1 * | 12/2004 | Lumpkin | ..................... | 119/57.9 |

* cited by examiner

*Primary Examiner* — Kristen C Hayes

(74) *Attorney, Agent, or Firm* — Eric Fincham

(57) ABSTRACT

A kit for a bird feeder comprising a guard member of a generally disk like configuration, the guard member sloping downwardly from an interior point to an exterior edge thereof, the guard member having a centrally located opening therein to encircle a bird feeder, and a generally circular wall extending downwardly from the lower surface of the guard member.

2 Claims, 7 Drawing Sheets

WEATHER GUARD FOR A BIRD FEEDER

FIELD OF THE INVENTION

The present invention relates to bird feeders and more particularly, relates to a bird feeder having a weather guard member. The invention also provides a kit which may be retrofitted through a known bird feeder.

BACKGROUND OF THE INVENTION

Bird feeders are well known in the art and there are many different types in the marketplace. These range from relatively simple and inexpensive tube type bird feeders to selective bird feeders which are designed to limit the maximum size of a bird or marauder which can access the seed in the feeder. The reasons for excluding certain birds may be many. Some bird feeders are designed to be specific to certain types of birds such as cardinals. Other bird feeders are specifically designed for smaller types of birds.

Generally, many of the larger birds which would access the seed are considered undesirable. These birds include crows, grackles, blue jays, etc. Marauders such as squirrels and the like are also considered undesirable since they consume the feed before the birds have the opportunity to do so.

One particular type of selective bird feeder is shown in U.S. Pat. No. 6,543,384, the teachings of which are hereby incorporated by reference. This selective bird feeder has received very positive reception in the marketplace. One possible disadvantage with the bird feeder is its use in inclement weather wherein the forces of nature can cause snow and water to enter the seed port and moisten the seed. If left for a period of time, the seed can become mouldy and represent a hazard to the birds.

SUMMARY OF THE INVENTION

It is an object of the present invention to provide a weather guard member which can fit on the seed tube and which weather guard will protect the seed ports from infiltration by moisture.

According to one aspect of the present invention, there is provided a kit for a bird feeder, the kit comprising a guard member formed of a sheet material, the guard member having a top surface thereof having a convex configuration and a bottom surface thereof having a concave configuration, the guard member having a centrally located opening therein, a generally circular wall extending downwardly from the lower surface of the guard member.

According to a further aspect of the present invention, there is also provided a bird feeder comprising a feed tube, at least one seed port in the feed tube, a perch located proximate the seed port, a protrusion located above the seed port, and a guard member extending around the seed tube, the guard member being formed of a sheet material and having a frustoconical configuration, a downwardly extending wall, the downwardly extending wall abutting the protrusion to support the guard member in a desired position.

The bird feeder used in the present invention is preferably that described in U.S. Pat. No. 6,543,384 or one similar thereto. However, the weather guard of the present invention can also be employed with other bird feeders as long as there is an abutment to support the weather guard member, with the abutment preferably being located above the seed port. However, it would be possible to utilize an abutment below the seed port if the downwardly depending wall were split to become a plurality of legs. The opening between the legs would be arranged to fit over the seed port. The term "downwardly extending wall" will include such an arrangement within its scope.

The material forming the weather guard member may be selected from any suitable. Conventionally, a metallic or plastic material would be employed although it is within the scope of the present invention to utilize other materials. The guard member can be formed of a sheet material or it could be molded.

With a kit utilized to retrofit a bird feeder, one or more collars may be provided. These collars will permit a variance in the spacing of the weather guard member from the seed ports.

Similarly, the size of the weather guard member may vary. In some environments, a relatively narrow portion may extend outwardly while in other environments, a wider portion would be appropriate.

The weather guard is preferably formed of a material having the required length (with any necessary reinforcing ribs). As such, the weather guard may have a frustoconical configuration with the material extending downwardly from adjacent the bird feeder to the outer extremity thereof. In one embodiment, the upper surface will have a convex configuration while the lower surface will have a concave configuration.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
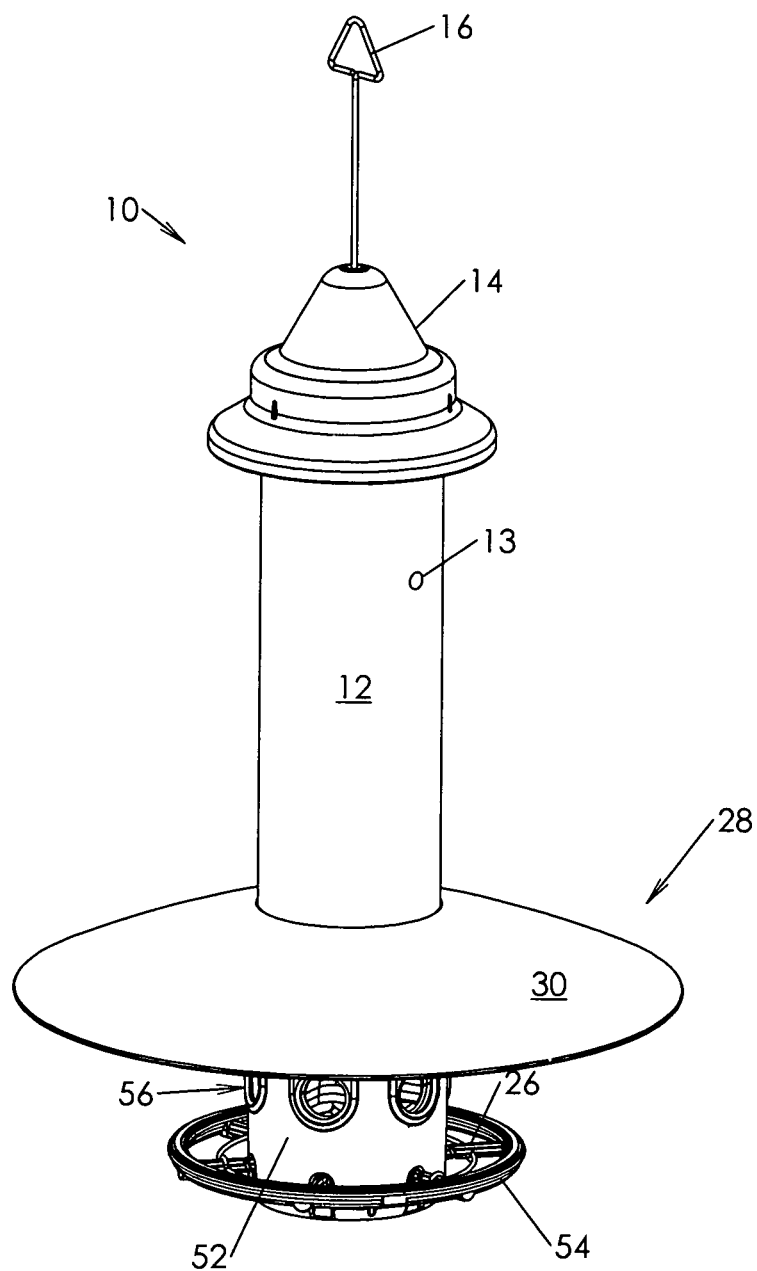
FIG. 1 is a perspective view of a bird feeder having a guard member thereon.

Referring to the drawings in greater detail and by reference characters thereto, there is illustrated a bird feeder which is generally designated by reference numeral 10.

Bird feeder 10 is of the type shown in U.S. Pat. No. 6,543,384 and includes a seed tube 12 which has a ventilation aperture 13 formed therein. A cover 14 sits on the upper portion of seed tube 12. The bird feeder is designed to be hung and thus has a hanger 16. A base member 18 is provided at the lower end of seed tube 12. It will noted that there is a skirt 20 which is located above seed ports 56. For access to seed ports 56, there is provided a circular perch 54 which is retained in position by retaining members 26.

As shown in the cross-sectional view, the bird feeder 10 includes a center tube 48 with a spring member 50. A shroud 52 is designed to move over the seed ports 22 when an excessive weight is placed thereon.

The bird feeder 10 has a weather guard member general designated by reference numeral 28. Weather guard member 28 has an upper surface 30 which forms a convex surface while a lower surface 32 thereof has a concave configuration. Weather guard member 28 may be formed of sheet material or it can also be molded and has a downwardly extending wall 34 which is sized to fit about seed tube 12. A rib 36 is provided for reinforcement.

Figure 2:
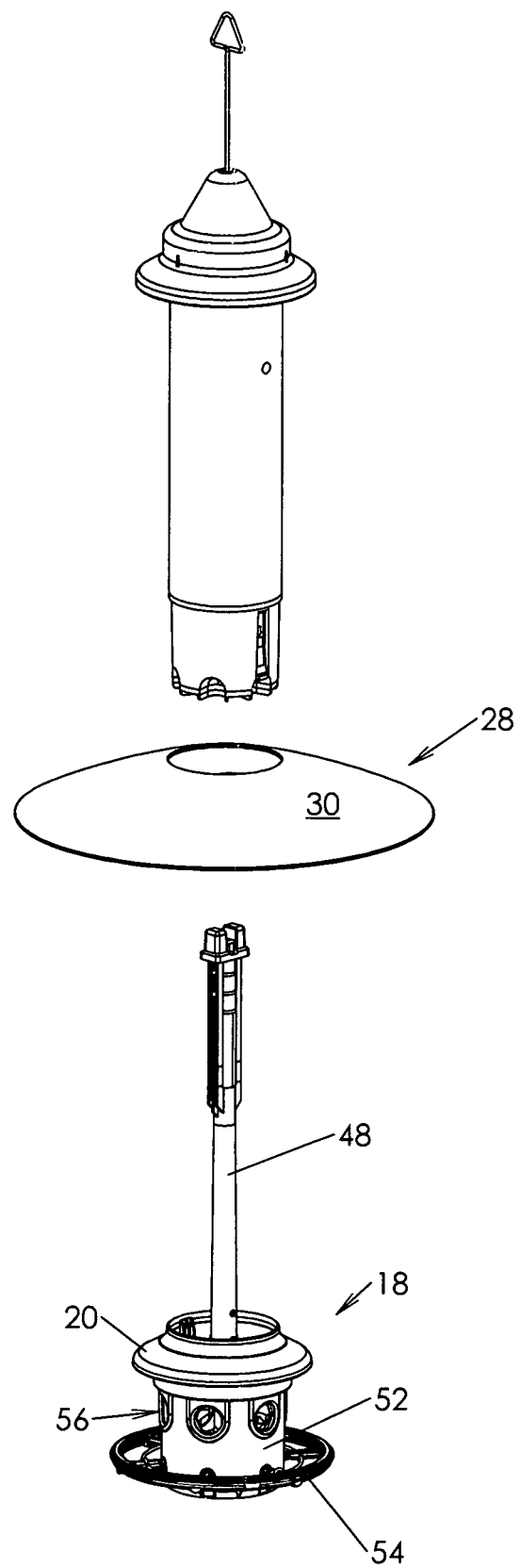
FIG. 2 is an exploded view of the bird feeder.
Figure 3:
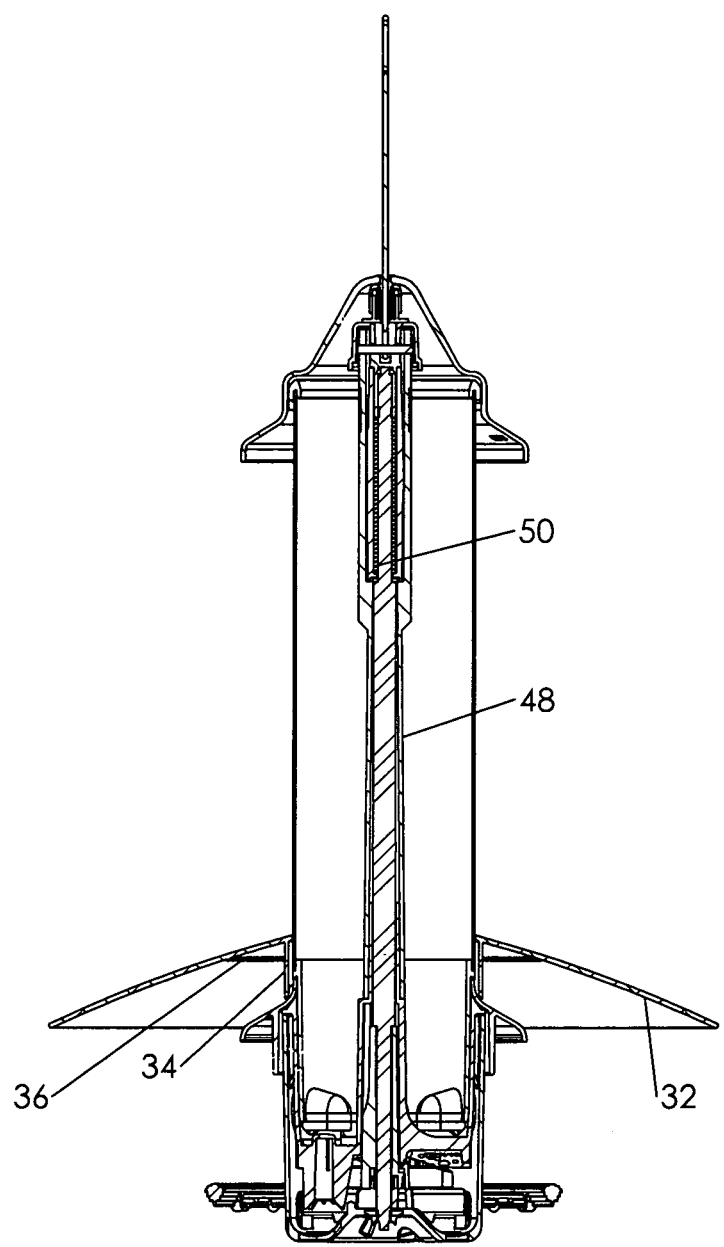
FIG. 3 is a longitudinal sectional view thereof.
Figure 4:
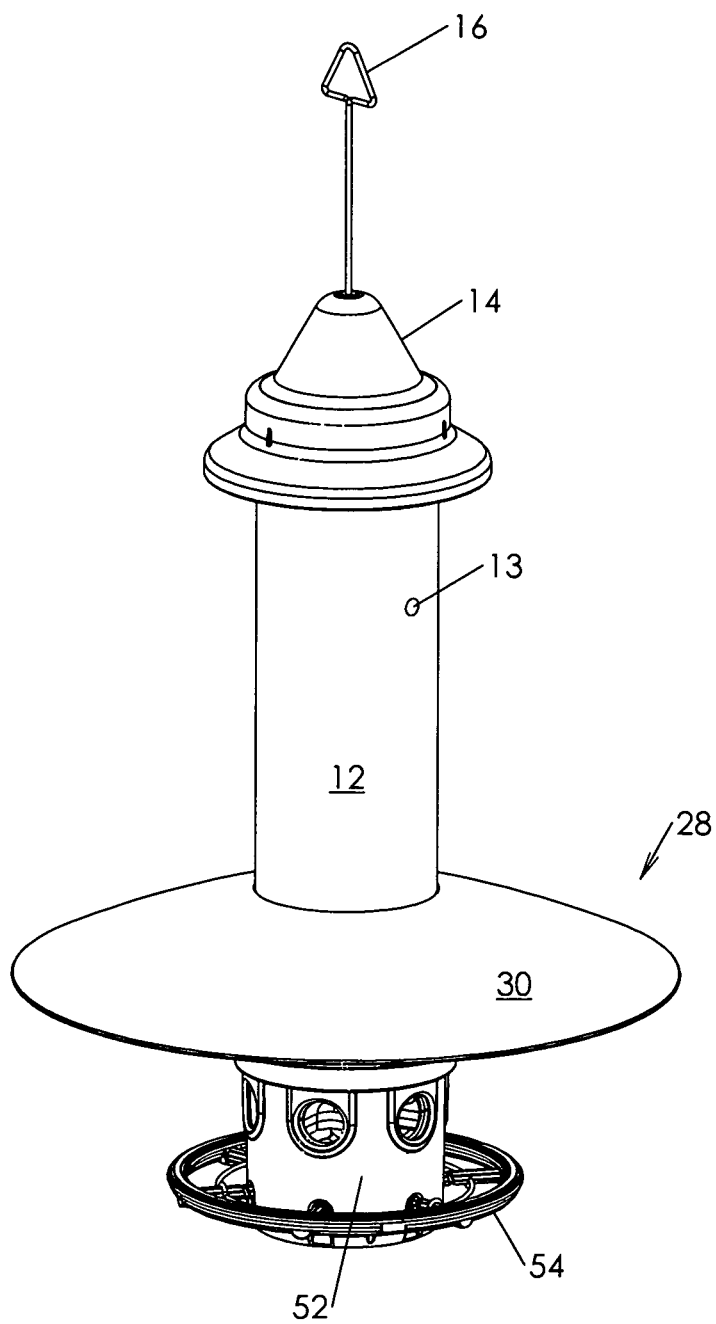
FIG. 4 is a perspective view of a bird feeder having a spacing collar.
Figure 5:
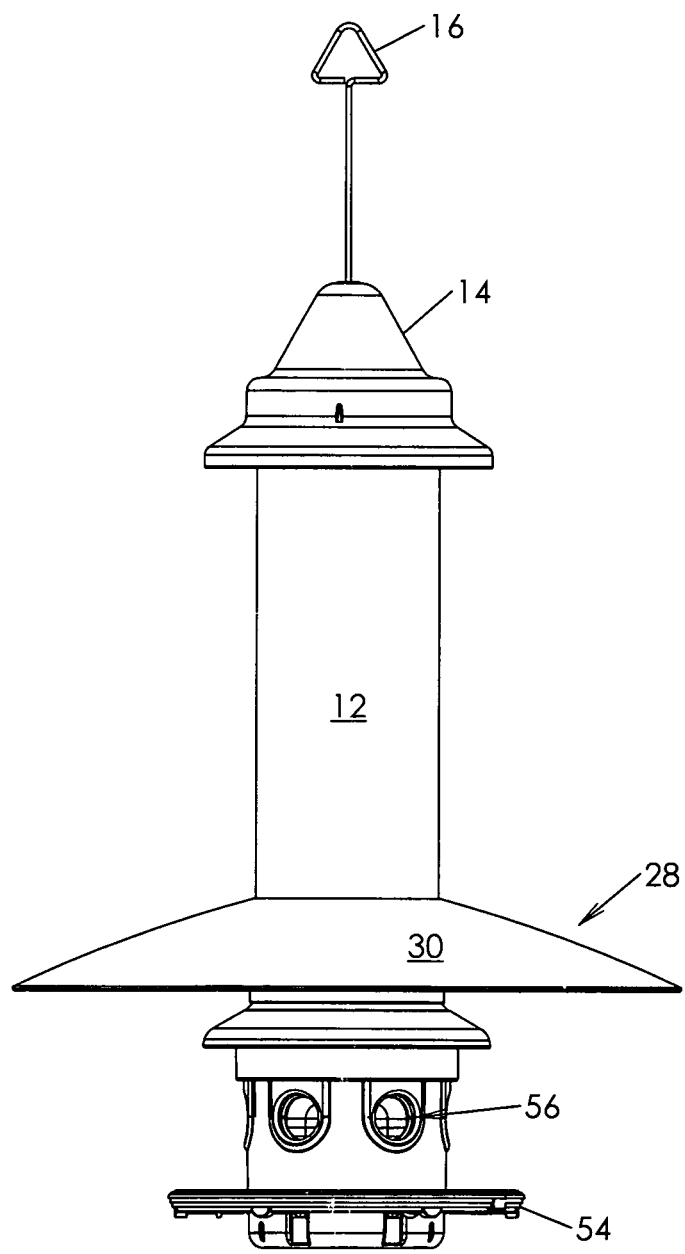
FIG. 5 is a side sectional view thereof.
Figure 6:
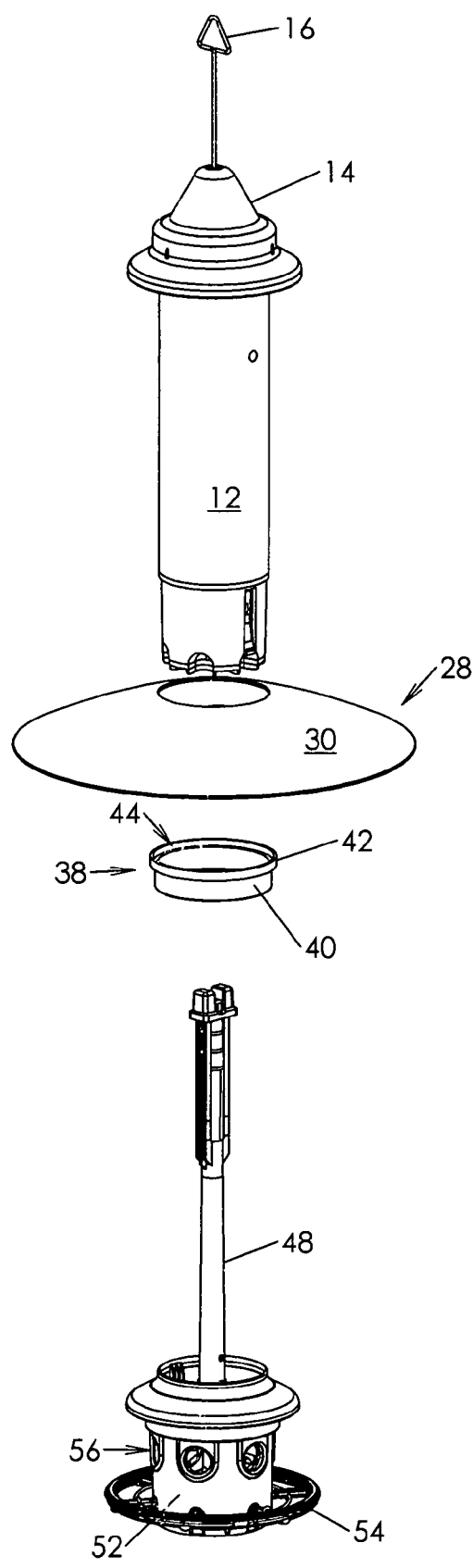
FIG. 6 is an exploded view thereof.
Figure 7:
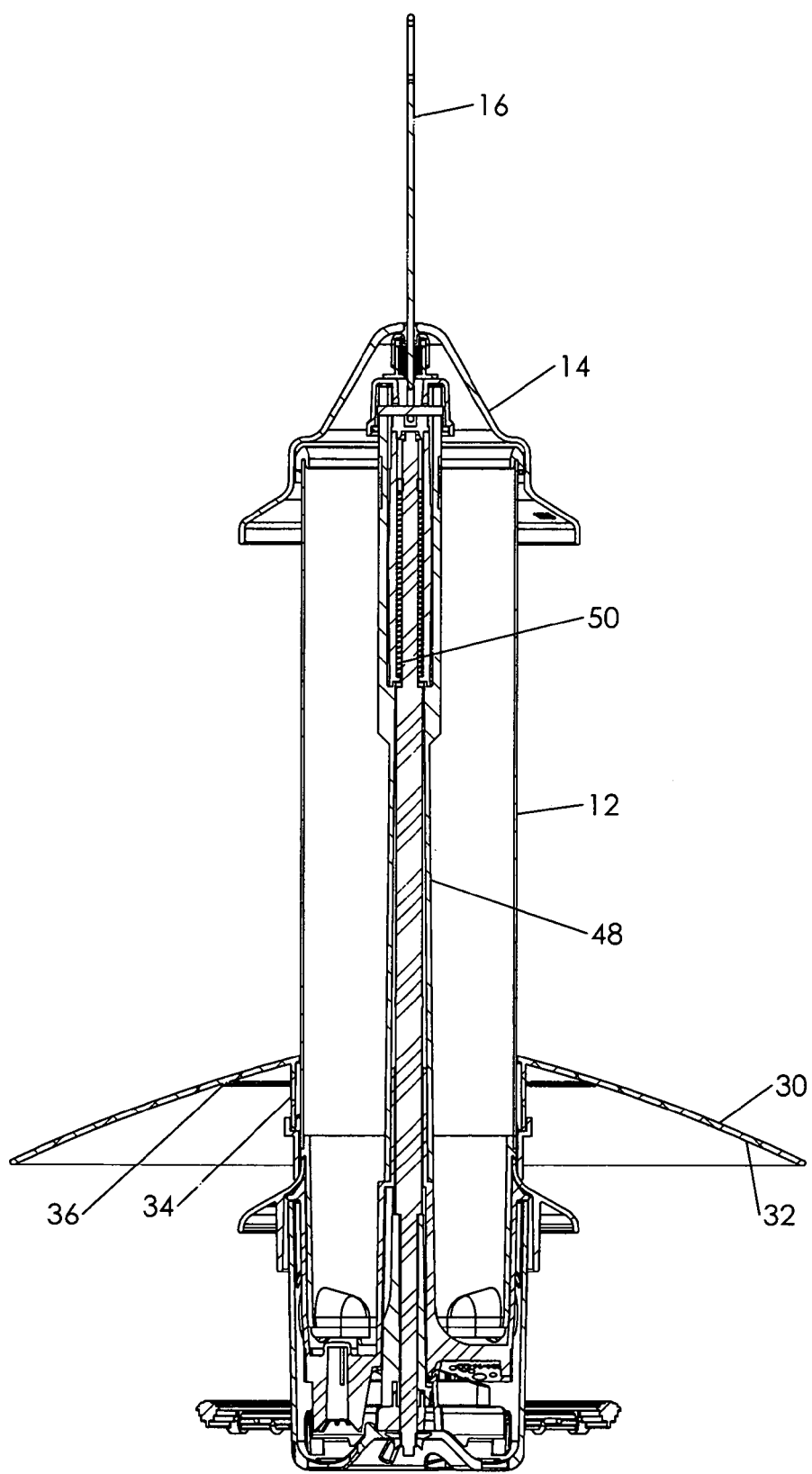
FIG. 7 is a longitudinal sectional view thereof.

In the embodiment of FIGS. 1 to 3, bird feeder 10 is of the type shown in U.S. Pat. No. 6,543,384, the teachings of which are hereby incorporated by reference. This selective bird feeder utilizes a center tube 48 having a spring 50 mounted therein. Spring 50 works to bias a shroud 52. A circular perch 54 surrounds seed ports 56.

A slightly different embodiment is shown in FIGS. 4 to 7. In this embodiment, there is provided a collar 38. Collar 38 has a lower circular wall 40 and an upper circular wall 42. The walls are of different thicknesses so as to provide a recess 44. The arrangement is such that recess 44 receives and supports downwardly extending wall 34 of the weather guard member 28. One or more collars may be provided so as to adjust the spacing between the seed ports 56 and weather guard member 28.

It will be understood that the above described embodiment is for purposes of illustration only and that changes and modifications may be made thereto without departing from the spirit and scope of the invention.

I claim:

1. A bird feeder comprising:
a feed tube;
at least one seed port in said feed tube;
a perch located proximate said seed port;
a protrusion located above said seed port;
a guard member extending around said feed tube, said guard member having a frustoconical configuration, a downwardly extending wall, said downwardly extending wall abutting said protrusion to support said guard member in a desired position; and
a collar member located below said guard member, said collar member comprising a lower circular wall an upper circular wall, said upper circular wall having an interior diameter greater than the interior diameter of said lower circular wall whereby a recess is formed within said upper circular wall.

2. A kit for a bird feeder, said kit comprising:
a guard member of a generally disc like configuration, said guard member sloping downwardly from an interior point to an exterior edge;
said guard member having a centrally located opening therein;
a general circular wall extending downwardly from a lower surface of said guard member; and
a collar, said collar being slightly larger than said opening in said guard member, said collar having a lower circular wall and an upper circular wall, said upper circular wall having an interior diameter greater than the interior diameter of said lower circular wall whereby a recess is formed within said upper circular wall.

* * * * *